(No Model.) 4 Sheets—Sheet 1.
S. H. SHORT.
REGULATOR FOR ELECTRIC MOTORS.
No. 514,429. Patented Feb. 6, 1894.
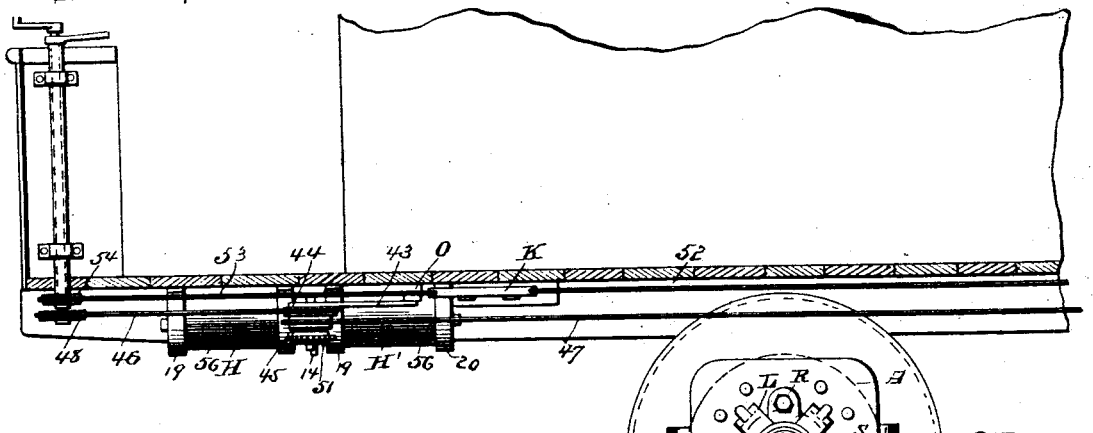
Fig. I
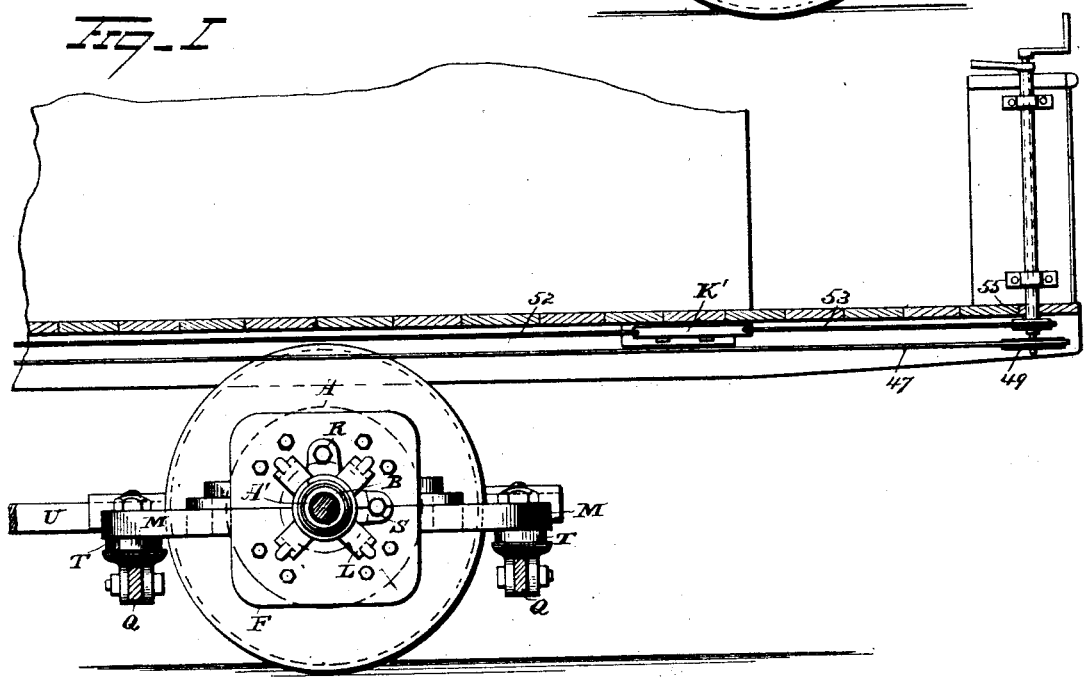
Witnesses
E. J. Nottingham
G. F. Downing
Inventor
Sidney H. Short
By H. A. Seymour
Attorney (No Model.) 4 Sheets—Sheet 2.
S. H. SHORT.
REGULATOR FOR ELECTRIC MOTORS.
No. 514,429. Patented Feb. 6, 1894.
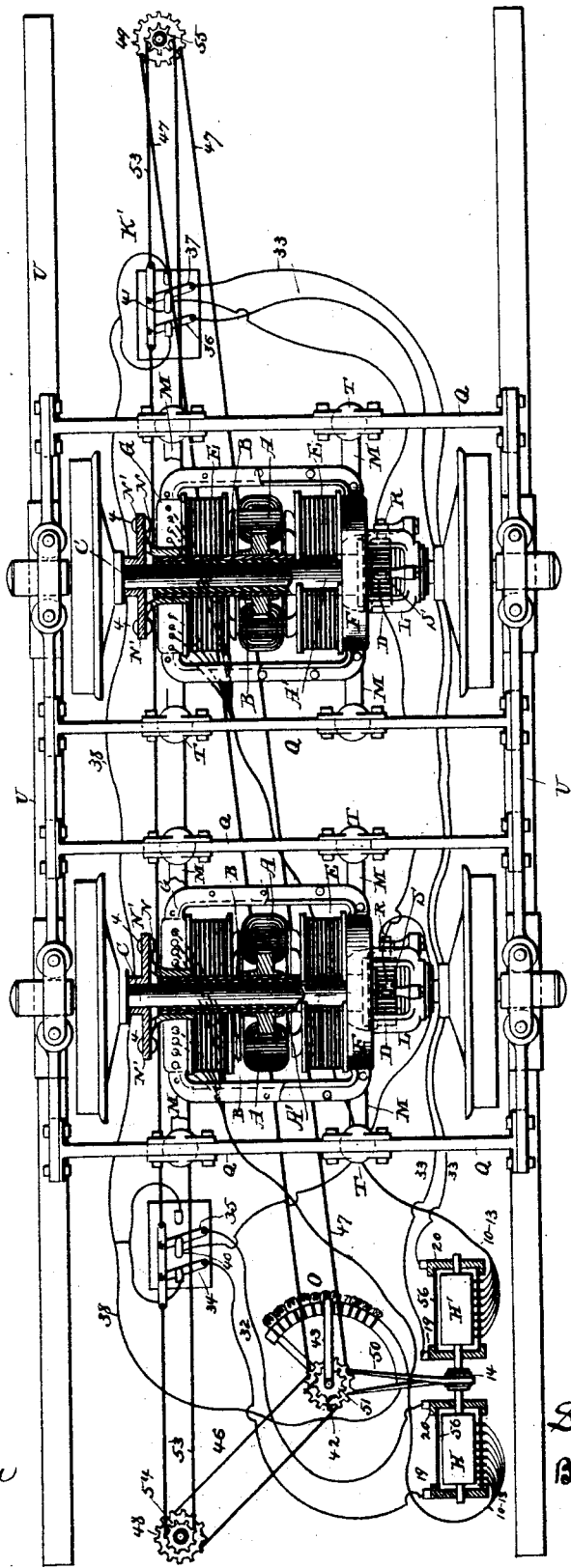
Fig. II.
Witnesses
E. Nottingham
G. F. Downing
Inventor
Sidney H. Short
By H. A. Seymour
Attorney (No Model.)   4 Sheets—Sheet 3.
S. H. SHORT.
REGULATOR FOR ELECTRIC MOTORS.
No. 514,429. Patented Feb. 6, 1894.
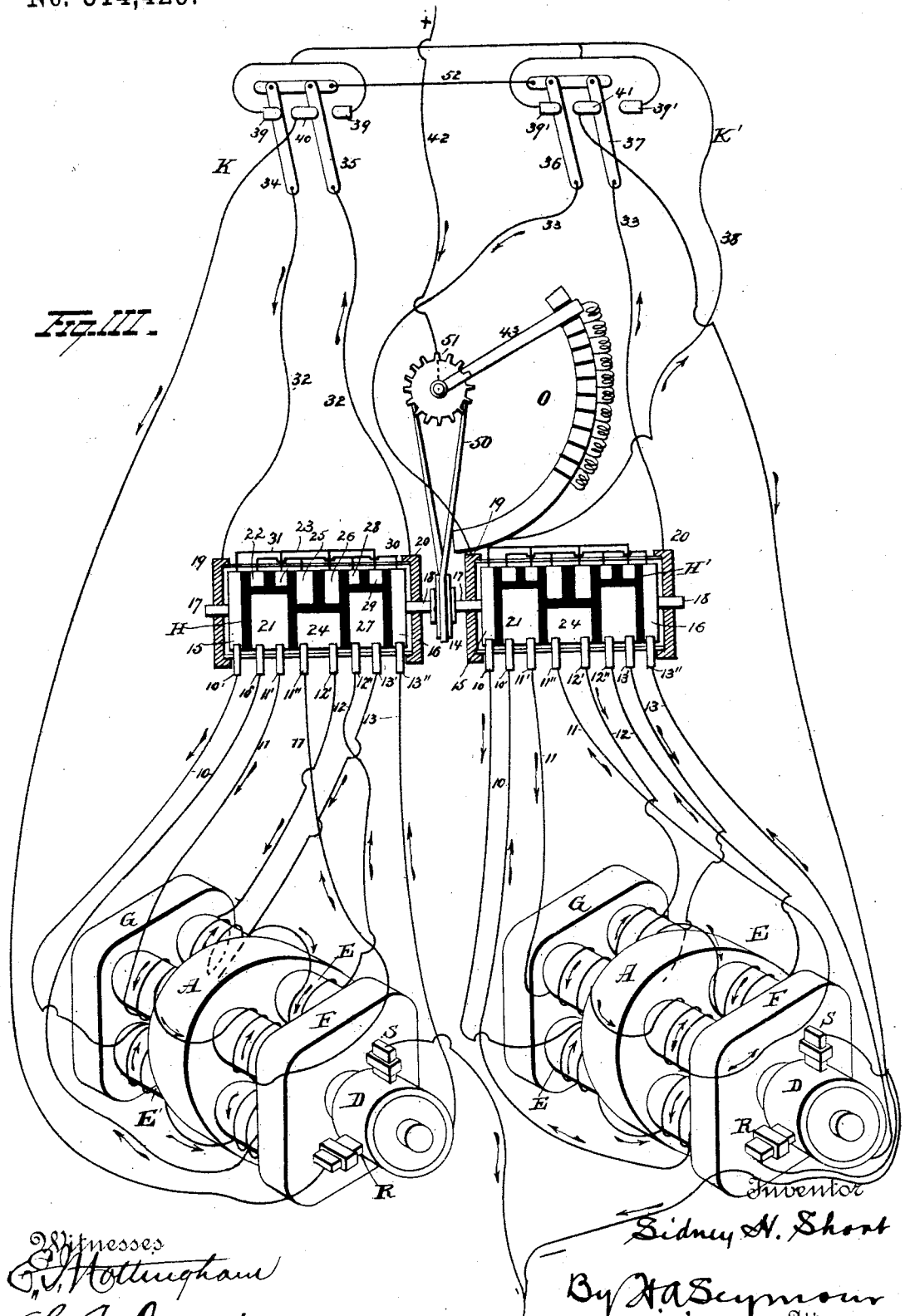

(No Model.) 4 Sheets—Sheet 4.
S. H. SHORT.
REGULATOR FOR ELECTRIC MOTORS.
No. 514,429. Patented Feb. 6, 1894.
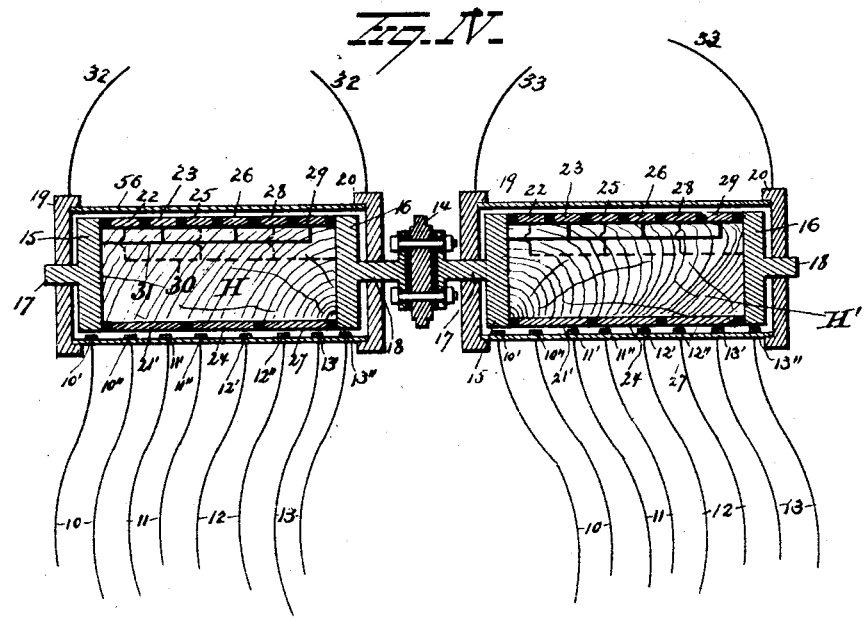
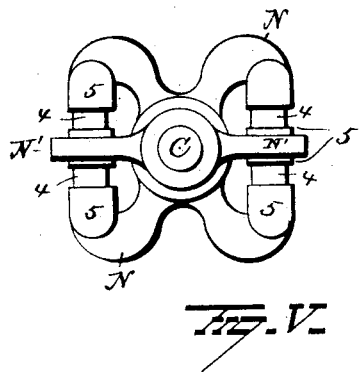
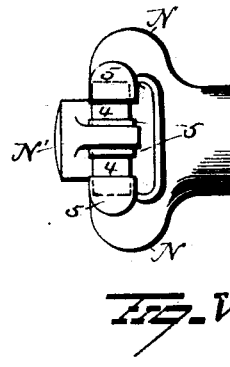
Witnesses
G. J. Nottingham
G. F. Downing
Inventor
Sidney H. Short
By H. A. Seymour
Attorney

UNITED STATES PATENT OFFICE.

SIDNEY H. SHORT, OF CLEVELAND, OHIO, ASSIGNOR TO THE SHORT ELECTRIC RAILWAY COMPANY, OF SAME PLACE.

REGULATOR FOR ELECTRIC MOTORS.

SPECIFICATION forming part of Letters Patent No. 514,429, dated February 6, 1894.

Application filed January 26, 1891. Serial No. 379,042. (No model.)

*To all whom it may concern:*

Be it known that I, SIDNEY H. SHORT, of Cleveland, in the county of Cuyahoga and State of Ohio, have invented certain new and useful Improvements in Regulators for Electric Motors; and I do hereby declare the following to be a full, clear, and exact description of the invention, such as will enable others skilled in the art to which it appertains to make and use the same.

This invention relates more particularly to regulators for electric motor cars, and it has also particular reference to multipolar motors; but each of the improvements constituting the said invention is included for all the uses to which it may be adapted.

In accordance with the present invention the coils of the different field magnets are included in the branches of a regulating switch adapted to connect them in series or in parallel. Thus in the case of a multipolar machine of four poles the magnet coils of each pole may be connected in series with those of the other three poles, or the magnet coils of two poles in series with each other may be connected in parallel with the magnet coils of the two other poles, or the magnet coils of all four poles may be connected in parallel with each other. Where there are more magnets than one for each pole, the coils of the magnets of each pole may be included in branches so that the commutation of the field may be extended to each magnet. Where there are more magnets than one to each pole it is possible to include different magnets in the same switch branch and still be within the invention. The foregoing improvement it will be observed differs from an ordinary commutation of the field in that in the latter different coils on the same magnet are commutated, whereas according to the present improvement the coils of different magnets have their connections with the supply circuit altered.

In applying the regulation as described to the motors of electric cars the field commutating switch may be employed in connection with a rheostat and reversing switch. Preferably the reversing switch is adapted to change the direction of the current in the field rather than in the armature, since this has been found to be practically advantageous, and the field commutating switch is placed with the field coils in the reversing loop of the said reversing switch. For two or more motors on the same car a field-commutating switch and a reversing switch are or may be employed for each motor; such arrangement is considered simpler and better (each motor being more independent of the other) than the use of the same reversing and field-commutating switch for both or all the motors although this latter arrangement is possible. The rheostat is connected with the field-commutating switch or switches so that they are adapted to be operated by the same appliances, and the mechanical connection is such that the resistances of the rheostat are cut out in advance of the commutation of the field.

In the accompanying drawings which form part of this specification, Figure I is a partial view in sectional elevation of an electric car having a regulator for the motors in accordance with the present invention. Fig. II is a partial bottom view of the said car. Fig. III is a diagram of the regulating means, and Figs. IV, V and VI detail views.

The car shown has a multipolar motor of four poles for each axle with the armature axially placed with reference to said axle and directly connected therewith. The armature A of each motor is fast on the hollow shaft A' which surrounds the car axle C with an insulating and cushioning sleeve B of soft vulcanized rubber interposed. The direct driving connection is through forks N on the shaft A' engaging arms N' fast on the car axle with spring pads 4 interposed. Metal cups 5 protect the pads. There are journal bearings for the shaft A' in the yoke G and bracket L of the motor frame. The bracket L is cast on the yoke F and carries the commutator brushes R and S which bear on the commutator D fast on the shaft A'. The field magnets have supporting arms M which rest upon cross bars Q with springs or buffers T interposed. The cross bars Q are fastened at the ends to the side bars U of the truck frame. The field magnets E project from the yokes F G on opposite sides of the armature A. There are eight for each motor the two magnets in line with each other on opposite sides of the armature being of like sign.

The mounting described for the motor constitutes no part of the present invention, and may so far as this is concerned be of any suitable description. As shown, the coils of the two magnets in line with each other are permanently connected so that there are four loops 10, 11, 12, 13 for each motor, and each loop includes the field coils of two magnets. These loops terminate in pairs of springs 10' and 10'', 11' and 11'', 12' and 12'', 13' and 13'' which bear upon the switch cylinders H, for the motor at the left of the figures, and H', for those at the right. These cylinders H H' are or may be alike and are connected so as to turn together, the connection shown consisting of flanges bolted together with a sprocket wheel 14 and insulating material interposed as shown in Fig. IV.

On the periphery of each cylinder are the switching plates or contacts. They comprise the disks 15 and 16 which form the heads to the cylinder (being fastened to the nonconducting body of the cylinder) and are provided with journal pins 17 and 18 by which the cylinder is journaled in bearings. The spring 10' rests upon the disk 15, and is in permanent connection with said disk, its journal pin 17 and the bearing 19 for said pin. Spring 13'' in like manner rests upon the disk 16 and is in electrical connection with its journal pin 18 and the bearing 20 of said pin. For the springs 10'' and 11' there are three plates 21, 22 and 23, the plate 21 being adapted to make contact with both springs and the plates 22 and 23 being adapted to make contact with them singly. For the springs 11'' and 12' there are plates 24, 25 and 26 similarly arranged to the preceding except that the plate 24 is shorter than the plate 21 and the plates 25 and 26 are longer than the plates 22 and 23. For the springs 12'' and 13' there are three plates 27, 28 and 29 arranged like those for the springs 10'' and 11'. The contacts 22, 25, 28 and 16 are electrically connected by a wire 30 let into the nonconducting body of the cylinder, and the contacts 15, 23, 26, and 29 are similarly connected by the wire 31. The wires of the supply loop 32 for the cylinder H, and 33 for the cylinder H' are led to the bearings for the journal pins. In the position shown (see Fig. III) the coils of all the magnets of each motor are connected in series as clearly shown. By turning the cylinder until the springs 11' and 12' rest upon the plates 25 and 26 respectively the coils of half the magnets are in parallel with the coils of the other half. From the disk 15 the current divides, one portion passing by way of the spring 10', loop 10, spring 10'', plate 21, spring 11', loop 11, spring 11'', plate 25 and wire 30 to the disk 16, while the other portion passes by way of the wire 31, plate 26, spring 12', loop 12, spring 12'', plate 27, spring 13', loop 13, spring 13'' to disk 16. By turning the cylinder until the springs 10'' and 11' rest on the plates 22 and 23, the magnet coils of the four field poles of each motor are in parallel, the loops 10, 11, 12 and 13 each having one spring (10', &c.,) in electrical connection with the disk 15 directly or through the wire 30, and the other spring (10'', &c.,) in electrical connection with the disk 16 directly or through the wire 31. The wires of supply loops 32 and 33 respectively are connected with the levers 34 35 and 36 37 of the reversing switches K K' of ordinary construction. The wire 38 from the rheostat O is branched, the branches leading to the outside contacts 39 and 39' respectively of the reversing switches. The middle contact 40 (or 41) of each reversing switch is connected with the commutator brush R of the corresponding motor the other brush S being grounded by the wire leading to a cross bar Q. The main supply wire 42 from the trolley, or car battery or the like, extends to the switch arm 43 of the rheostat. To adjust the position of this switch lever, there are two sprocket wheels 44 45 on a short shaft carrying said arm and an endless chain 46 or 47 runs from one of said wheels to a corresponding wheel 48 or 49 on the vertical shaft at the dash board of the car, which is operated by the motor man.

The field commutating switches H H' are operated by an endless chain 50 extending from the sprocket wheel 51 on the shaft of arm 43 to the sprocket wheel 14. The parts are so arranged that while the arm 43 travels over the contact board of the rheostat so as to cut out resistances the electrical connections at the field commutating switches are unaltered, but after the resistance has been cut out at the rheostat, the switches H H' are then operated to put the magnets of each motor in series of two (or more strictly of four) magnets in two parallel branches, and then in four parallel branches. In this movement the switching arm makes contact with the last plate of the rheostat board which is extended for that purpose. The levers of the reversing switches are connected by a rod 52 and operated by a chain 53 which runs around the sprocket wheels 54 55 at the ends of the car and is connected with the extremities of the rod 52. The wheels 54 and 55 are on hollow shafts which surround the shafts of the wheels 48 and 49 and are operated by the motor man. To protect them from dirt the switches H H' (including the cylinders and springs) are inclosed in a casing 56 (see Fig. IV).

Having fully described my invention, what I claim as new, and desire to secure by Letters Patent, is—

1. The combination with the driving axles of a car and a multipolar electric motor connected with each axle, of two independent commutating switches for connecting the coils of different field-magnets in multiple or in series, a rheostat included in the field circuits of both motors, a reversing switch included in the field circuit of each motor, and means for connecting the commutating switches and rheostat whereby the said parts may be operated simultaneously from either end of the car, substantially as set forth.

2. The combination with the driving axles of a car and a multipolar electric motor connected with each axle, of two commutating switches for connecting the coils of different field magnets in multiple or series, said switches being inclosed in separate casings insulated from each other, a rheostat included in the field circuits of both motors, a reversing switch included in the field circuit of each motor and means for simultaneously actuating said rheostat and commutating switches from either end of the car, substantially as set forth.

3. The combination with the driving axles of a car and a multipolar electric motor connected with each axle, of two commutating switches for connecting the coils of different field magnets in multiple or series, said switches being inclosed in separate casings and insulated from each other, and a pulley applied to the insulated connection for simultaneously actuating both switches, substantially as set forth.

4. The combination with the driving axle of a car and a multipolar electric motor connected with each axle, of two commutating switches for connecting the coils of different field magnets in multiple or in series, said switches being encircled in separate casings and connected by shafts insulated from each other, a reversing switch located at opposite ends of the car, each switch being included in the field circuit of its own motor, a rheostat included in the field circuits of both motors, means for simultaneously operating both reversing switches from either end of the car, and means for simultaneously operating the rheostat and both commutating switches from either end of the car, substantially as set forth.

5. The combination with the axles of a car, of two propelling motors one connected with each driving axle, two field commutating switches connected together so as to be simultaneously actuated loops from the switch contacts including the field magnet coils of both motors, whereby the field magnet coils of the two motors may be simultaneously connected in series or in parallel, substantially as set forth.

6. The combination with the driving axles of a car of a propelling electric motor connected with each axle, two field commutating switches connected together so as to be actuated simultaneously loops from the switch contacts including the field magnet coils whereby the latter may be connected in series or in parallel, and a reversing switch connected with each motor, and means for simultaneously actuating the reversing switches, substantially as set forth.

7. The combination with the driving axles, of a car, of a propelling electric motor connected with each axle, two field commutating switches, one for each motor, loops from the switch contacts including the coils of the field-magnets whereby the coils may be connected in series or in parallel, a rheostat, and means whereby the rheostat and field commutating switches are actuated by the same appliances, substantially as set forth.

In testimony whereof I have signed this specification in the presence of two subscribing witnesses.

S. H. SHORT.

Witnesses:
A. B. CALHOUN,
L. S. NOLD.